United States Patent [19]

Shekhawat et al.

[11] Patent Number: 4,847,745
[45] Date of Patent: Jul. 11, 1989

[54] THREE PHASE INVERTER POWER SUPPLY WITH BALANCING TRANSFORMER

[75] Inventors: Sampat S. Shekhawat; Mahesh J. Shah; Jayant G. Vaidya; John J. Dhyanchand, all of Rockford, Ill.

[73] Assignee: Sundstrand Corp., Rockford, Ill.

[21] Appl. No.: 272,061

[22] Filed: Nov. 16, 1988

[51] Int. Cl.[4] .......................................... H02M 7/5387
[52] U.S. Cl. ..................................... 363/132; 363/137
[58] Field of Search ................ 323/361; 363/132, 137, 363/40

[56] References Cited

U.S. PATENT DOCUMENTS

| | | | |
|---|---|---|---|
| 3,074,030 | 1/1963 | Hierholzer, Jr. | 363/136 |
| 3,246,226 | 4/1966 | Geisler et al. | 363/136 |
| 3,328,667 | 6/1967 | Shaneman | 363/136 |
| 3,351,841 | 11/1967 | Lipman et al. | 363/136 |
| 3,381,171 | 4/1968 | Kienast | 363/136 |
| 3,398,348 | 8/1968 | Kilgore et al. | 363/123 |
| 3,448,299 | 6/1969 | Hierholzer, Jr. et al. | 363/136 |
| 3,469,169 | 9/1969 | Schlabach et al. | 363/138 |
| 3,504,266 | 3/1970 | Schlabach et al. | 363/138 |
| 3,628,123 | 12/1971 | Rosa | 363/43 |
| 3,775,663 | 11/1973 | Turnbull | 363/41 |
| 3,876,923 | 4/1975 | Humphrey et al. | 363/71 |
| 4,392,193 | 7/1983 | Frola | 363/128 |
| 4,488,211 | 12/1984 | Miyairi | 363/45 |
| 4,489,371 | 12/1984 | Kernick | 363/41 |
| 4,500,829 | 2/1985 | Specht et al. | 323/215 |
| 4,507,724 | 3/1985 | Glennon | 363/132 |
| 4,513,240 | 4/1985 | Putman | 323/210 |
| 4,532,581 | 7/1985 | Miyairi | 363/39 |
| 4,564,895 | 1/1986 | Glennon | 363/41 |
| 4,617,622 | 10/1986 | Fox | 363/98 |
| 4,677,539 | 6/1987 | Erickson et al. | 363/132 |

Primary Examiner—Patrick R. Salce
Assistant Examiner—Jeffrey Sterrett
Attorney, Agent, or Firm—Antonelli, Terry & Wands

[57] ABSTRACT

A three phase inverter (40) is disclosed for use with loads (100) which are unbalanced. A transformer (80) having primary windings (82), (84) and (86) which are respectively connected to phase outputs (52, 54 and 56) has a secondary having individual windings (88, 90 and 92) connected in a delta configuration which minimizes the flow of unbalanced current in the unbalanced load. A second embodiment utilizes a transformer in an interconnected configuration. A neutral connecting the conductive switches to the load is unnecessary with the invention.

10 Claims, 4 Drawing Sheets

THREE PHASE INVERTER POWER SUPPLY WITH BALANCING TRANSFORMER

DESCRIPTION

TECHNICAL FIELD

The present invention relates to three phase inverter power supplies with unbalanced loads having reduced weight. More particularly, the present invention relates to power supplies of the foregoing type which do not have a neutral line running from the power supply to the load.

BACKGROUND ART

FIG. 1 illustrates a three phase auto transformer 10 having first, second and third primary windings 12, 14 and 16 which are respectively magnetically coupled to secondary windings 18, 20 and 22. The secondary windings 18, 20 and 22 are in a delta connected tertiary which is idle under normal balanced operation but contains current flow when a fault or an unbalanced load situation exists in electrical loads (not illustrated) connected to the phase outputs 24, 26 and 28. Phase inputs are applied to terminals 30, 32, and 34.

FIGS. 2A and B illustrate respectively a three phase auto transformer an a zig-zag transformer with windings 13, 15 and 17 connected to phase inputs and outputs 30, 32 and 34 and ground which is known as an interconnected star grounding transformer. In FIG. 2A each of the windings 13, 15 and 17 has a first part 19 wound in a first direction and a second part 21 wound in the opposite direction. In FIG. 2B, each of the windings 13, 15 and 17 has a first part 19 and a second part 21 wound in the same direction. In FIGS. 2A and B, the windings 13, 15 and 17 function to divide the neutral current into three equal parts when the transformer is connected to an unbalanced load (not illustrated).

U.S. Pat. No. 4,617,622 discloses a three phase inverter which has three pairs of switches connected between reference points of a DC potential. The switches are switched to produce a three phase AC output. The three phase output is filtered. The filtered output is connected to a neutral forming transformer.

A power supply has been developed by Westinghouse Electric Corporation having a switching matrix which switches a DC potential coupled to the switching matrix to create a staircase waveform at a desired fundamental frequency to produce three phase AC. With reference to FIG. 3 of the present invention, the prior art Westinghouse topology has a switching matrix containing switches $Q_1$, $\overline{Q_1}$, $Q_2$, $\overline{Q_2}$, $Q_3$ and $\overline{Q_3}$ which are switched to provide a three-phase output which is connected to a filter and a neutral forming transformer. For an unbalanced load, current flows from one of the switches $Q_1$, $Q_2$ and $Q_3$ which is conductive through the load, the neutral, and back to the negative terminal of the DC source through two of the switches $\overline{Q_1}\overline{Q_2}$ and $\overline{Q_3}$ which are not connected to a conductive switch. This power supply does not utilize a fourth wire to return current flowing through the neutral to the DC source.

U.S. Pat. No. 3,775,663 discloses that a problem has existed regarding inverters with a neutral terminal in maintaining the neutral terminal at correct potential when loads are unbalanced. The '663 patent further discloses that inverters with three output terminals have used a polyphase output transformer connected, for example, delta on the inverter side and wye on the load side. This produces a neutral transformer terminal which is undisturbed by unbalanced loads. The '663 patent further discloses that the pulse width modulation of each phase of an inverter to produce three phase output current. Each inverter phase consists of a pair of switches connected between two reference potentials which are alternatively pulse width modulated such that each switch is closed to conduct current from one of the reference potentials through a phase output which is filtered to eliminate higher frequency components than the fundamental desired phase output. Furthermore, the configuration of the inverter requires that the potential which is to be applied to the load must be switched completely by the switches of the inverter. If a high potential is required for the load, it is necessary for the switches to switch this high potential which can cause damage or failure.

U.S. Pat. No. 4,564,895 which is assigned to the assignee of the present invention discloses a bidirectional switch which connects an inverter to the neutral.

U.S. patent application Ser. No. 128,444, filed on Dec. 3, 1987, which is assigned to the assignee of the present invention, discloses a DC to AC inverter with neutral in which the neutral is formed by a filter which functions to shunt high frequency harmonics to the neutral of the inverter and an envelope defined by the fundamental frequency being applied to a three phase load with neutral. The inverter has first, second and third switching circuits each having a series circuit having first and second switches with at least one of the first switches and at least one of the second switches being in the on state during operation of the inverter in driving an unbalanced load to permit current to flow from the LC circuit to the unbalanced load and from the unbalanced load back to the LC circuit without a fourth wire.

In airframes it has been the practice to run three phases and a fourth wire which is a neutral from the generator to the load. The fourth wire adds considerable weight as a consequence of a large diameter necessary to permit the flow of substantial neutral current when the three phase load is substantially unbalanced. This fourth wire represents a weight penalty.

DISCLOSURE OF INVENTION

The present invention provides a multiple phase inverter power supply with neutral for connection to unbalanced loads having reduced weight and which eliminates a neutral running between the inverter and the load. Furthermore, the invention reduces the voltage switched across the inverter switches when a transformer is used which has a stepped up output while achieving the weight savings of elimination of the neutral between the inverter switches and the load which is of particular importance in airframes. Each of the phase outputs from the power supply are connected to a filter which removes ripple frequency components higher than the fundamental. The filter forms a neutral for conducting unbalanced current flow in a multiple phase unbalanced load and eliminates the neutral running between the inverter and load. The respective phase outputs from the filter are connected to a transformer having its primary windings in a wye configuration. A secondary delta winding functions as a balancing winding to minimize the flow of unbalanced current in a three phase unbalanced load respectively having phases connected to the different primary windings. Alternatively, the transformer may be an interconnected star grounding transformer.

A multiple phase inverter with a neutral in accordance with the invention includes a plurality of pairs of phase switches, each pair of phase switches being connected in series between first and second reference potentials, each switch being switched between conductive and non-conductive states; a plurality of outputs each respectively coupled at a junction between a different pair of the plurality of pairs of switches; a controller for causing each switch of a pair of switches which is connected to one of the first and second reference potentials to be conductive for an interval and for causing at least one other switch of one of the other pairs of switches which is connected to another of the first and second reference potentials to also be conductive during the interval to provide a path for current between the switches without a neutral connecting the conductive switches to the load; a filter having a plurality of inputs coupled respectively to a different one of the outputs and forming the neutral, the filter shunting frequency components above a fundamental frequency determined by a switching rate of the pairs of switches to the neutral and respectively providing a plurality of different phase outputs at the fundamental frequency; a multiple phase transformer having a plurality of windings coupled in a wye configuration with a first terminal of a plurality of inputs of the transformer respectively coupled to a different one of the plurality of outputs and a second terminal of the windings coupled to the neutral and a phase output coupled to each of the windings, the transformer having a secondary with a plurality of windings connected in a delta configuration; and the phase outputs of the transformer each respectively being for connection to a separate phase of an unbalanced multiple phase load. The conductive interval of each switch is pulse width modulated during a cycle of current with a duty cycle proportional to a desired magnitude of current at any point in time during a cycle of current on a different one of the phase outputs. The transformer may be an auto transformer which steps up potential applied to the windings from the inverter to the load.

A multiple phase inverter with a neutral in accordance with the invention includes a plurality of pairs of phase switches, each pair of phase switches being connected in series between first and second reference potentials, each switch being switched between conductive and non-conductive states; a plurality of outputs each respectively coupled at a junction between a different pair of the plurality of pairs of switches; a controller for causing a conductive interval of each switch of a pair of switches which is connected to one of the first and second reference potentials to be conductive for an interval and for causing at least one other switch of one of the other pairs of switches which is connected to the other of the first and second reference potentials to also be conductive during the interval to provide a path for current between the switches without a neutral connecting the conductive switches to the load; a filter having a plurality of inputs coupled respectively to a different one of the outputs and forming the neutral, the filter shunting frequency components above a fundamental frequency determined by a switching rate of the pairs of switches to the neutral and respectively providing a plurality of different phase outputs at the fundamental frequency; a multiple phase transformer having a plurality of windings coupled in an interconnected star configuration with a first terminal of a plurality of inputs respectively coupled to a different one of the plurality of phase outputs and a second terminal of the windings coupled to the neutral and a phase output coupled to each of the windings and the phase outputs of the transformer each respectively being for connection to a separate phase of an unbalanced multiple phase load. The conductive interval of each switch is pulse width modulated during a cycle of current with a duty cycle proportional to a desired magnitude of current at any point in time during a cycle of current on a different one of the phase outputs. The transformer may be a auto transformer which steps up a potential applied to the windings from the inverter to the load.

BEST MODE FOR CARRYING OUT THE INVENTION

Figure 1:
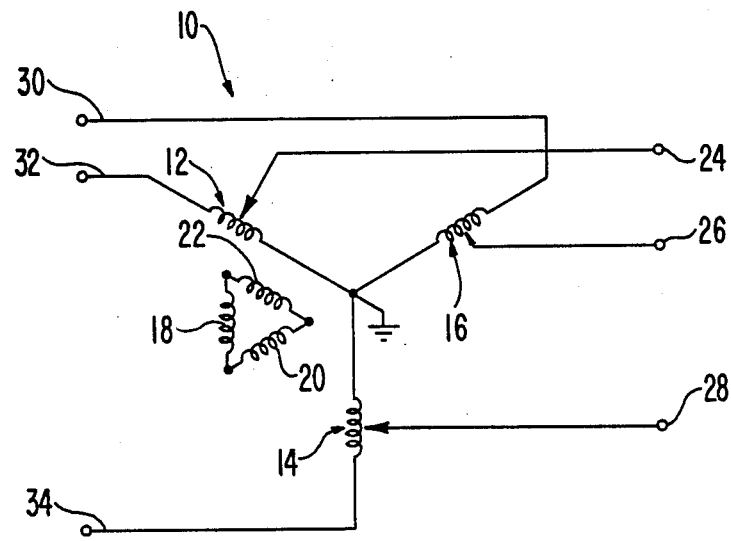
FIG. 1 illustrates a first type of prior art transformer for use in unbalanced three phase power supplies.
Figure 2A:
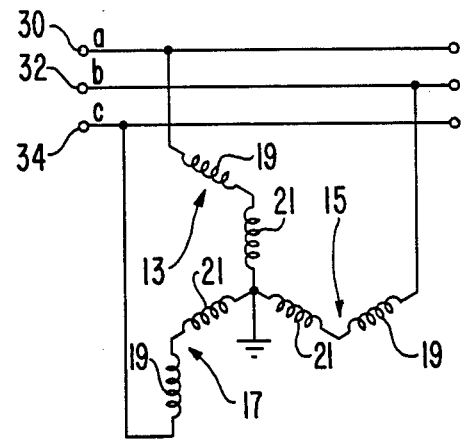
FIGS. 2A and B illustrate prior art transformers for use in unbalanced three phase power supplies.
Figure 2B:
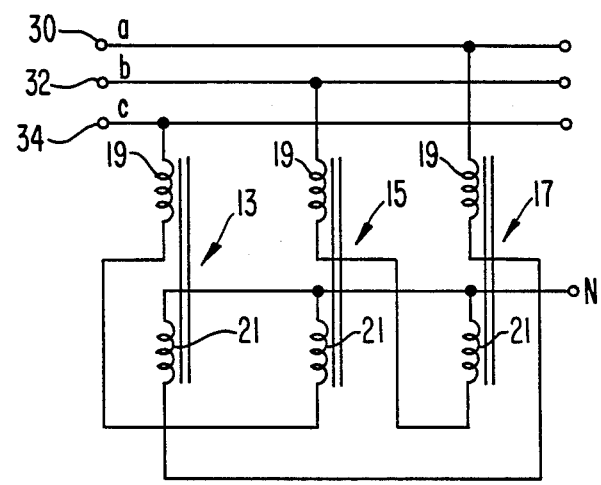
Figure 3:
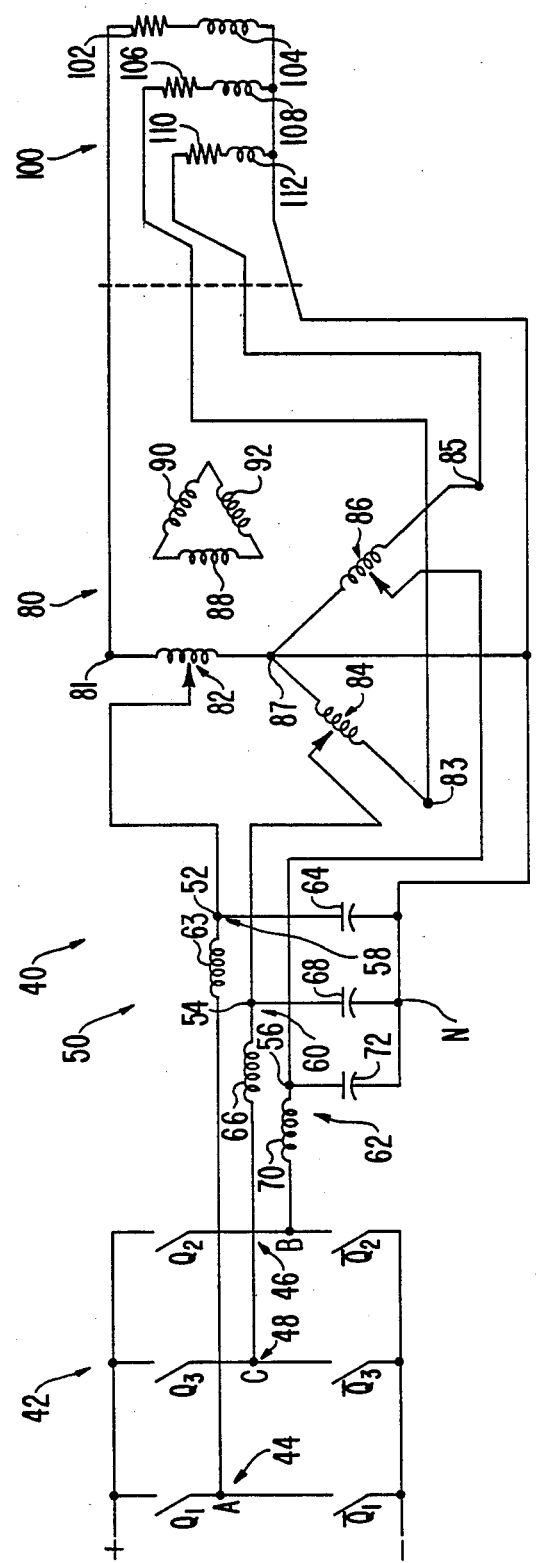
FIG. 3 illustrates an embodiment of the present invention.

FIG. 3 illustrates a first embodiment 40 of the present invention. The embodiment provides a multiple phase inverter power supply for connection to unbalanced loads with a transformer having a wye connected primary and a delta connected secondary for minimizing the effect of unbalanced current flow in the multiple phase unbalanced load which eliminates a neutral between the inverter switches and the load which is an important weight savings for power supplies in airframes. Furthermore, when a step up transformer is used between the inverter and load, the potential switched across switches of the inverter is reduced which is beneficial when a high potential is to be applied to the load. A three phase inverter 42 provides switched DC potentials of either positive or negative polarity respectively at the outputs A, B and C which are phase displaced 120° from each other. Switches Q1 and $\overline{Q1}$ are switched to produce the phase A output. Switches Q2 and $\overline{Q2}$ are switched to produce the phase B output. Switches Q3 and $\overline{Q3}$ are switched to produce the phase C output. Each of the switches Q1, $\overline{Q1}$, Q2, $\overline{Q2}$, Q3 and $\overline{Q3}$ has a conductive interval which conducts current to its phase output. The conductive interval is pulse width modulated in accordance with conventional inverter operation to produce output pulses having a duty cycle directly proportional to the magnitude of a sine wave at any particular time during a cycle of current produced by the phase. As a consequence of elimination of the neutral between the inverter switches and the load, a return path for current must be provided back to the inverter for current flowing from any one of the outputs A, B or C by appropriate control of the switches as follows. When any one of the switches $Q_1$, $Q_2$ and $Q_3$ of the pairs 44–48 is conductive, at least one of the switches $\overline{Q_1}$, $\overline{Q_2}$ and $\overline{Q_3}$ of at least one of the other pairs is conductive to permit current to flow from one of the reference potentials (+) through one of switches connected to the reference potential from one of the outputs A, B or C to the three phase load and back to at least another one of the outputs A, B or C through at least one of the switches which is coupled to the other of the reference potentials (−). A controller for switching the switches in accordance with the foregoing sequence is not described herein as it is conventional practice to control the time of switching and duty cycles of switches in inverters. However, as is understood by those skilled in the art, the controller is based upon conventional designs for switching switches in inverters which are not part of the present invention. It should be understood that each of the pairs of switches 44, 46 and 48 may be implemented in any switching device having conductive and non-conductive states which are changed in response to switching signals. The pulse width modulated current pulses produced by the respective phase outputs A, B and C are applied to a filter 50. The filter 50 functions to pass the fundamental frequency to phase outputs 52, 54 and 56 and shunt higher frequency ripple current to the neutral N. The filter 50 has three LC filters 58, 60 and 62. The LC filter 58 is comprised of inductor 62 and capacitor 64. The filter 60 is comprised of inductor 66 and capacitor 68. The filter 62 is comprised of inductor 70 and capacitor 72. Each of the filters 58, 60 and 62 function to shunt higher harmonics to the neutral N and to pass the fundamental frequency respectively at the phase outputs 52, 54 and 56.

The phase outputs 52, 54 and 56 are applied to auto transformer 80. The phase A output 52 is applied to winding 82. The phase C output 54 is applied to winding 84. The phase B output 56 is applied to winding 86. The junction 87 of the windings 82, 84 and 86 are connected to the neutral N. As illustrated, the transformer 80 is a step up transformer with the inputs 52, 54 and 56 being connected to the windings 82, 84 and 86 at a point for providing a desired amount of stepping up the voltage on the outputs 81, 83 and 85. For loads which require high potentials, the use of a step up transformer is advantageous in lessening stress on the switches of the inverter 42. However, it should be understood that the invention is not limited to use of a step up transformer. The secondary of the transformer consists of a delta connection of secondary windings 88, 90 and 92 which are respectively magnetically coupled to windings 82, 84 and 86. The secondary delta windings 88, 90 and 92 function to minimize the flow of unbalanced current in unbalanced three phase load 100. It should be understood that the unbalanced three phase load 100 may be any three phase unbalanced load with the illustrated load being only suggestive of possible types of unbalanced loads which may be utilized with the present invention. As illustrated, the phase A portion of the three phase load 100 consists of resistor 102 connected in series with inductor 104 which is connected to the neutral N. The phase C portion of the unbalance load 100 consists of resistor 106 which is connected in series with inductor 108 which is connected to the neutral N. The phase B portion of the unbalanced load 100 consists of resistor 110 which is connected in series with inductor 112 which is connected to the neutral N.

Figure 4:
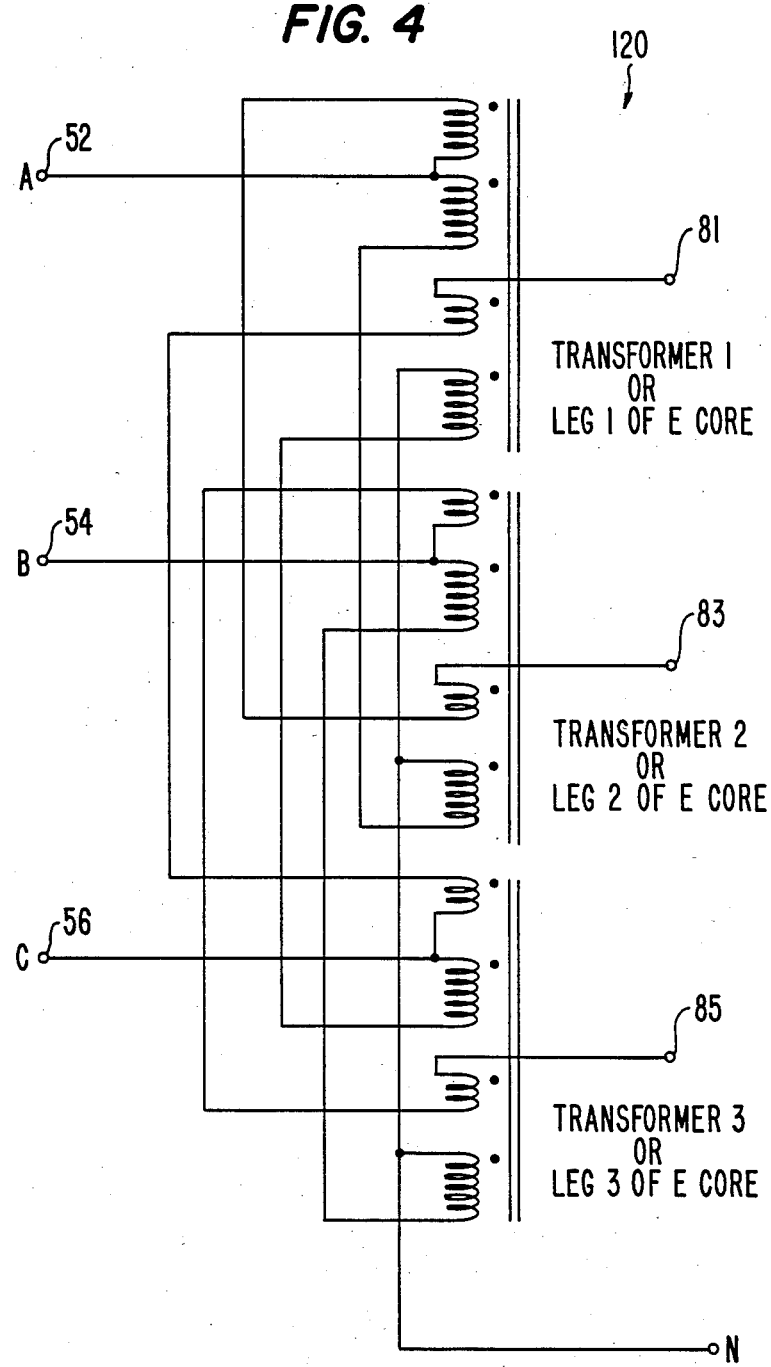
FIG. 4 illustrates a second embodiment of the present invention.

FIG. 4 illustrates an alternative embodiment which differs from FIG. 3 in the type of transformer that is used. Like reference numerals identify like parts. Transformer 120 is configured as a step up interconnected star grounding transformer. The transformer minimizes unbalanced current flow. The transformer 120 may be a single core with three parallel legs which are interconnected with a magnetically permeable material or three separate magnetically linked transformers as illustrated. The amount that the outputs 81, 83 and 85 are stepped up is determined by the DC potential of the inverter and the desired potential to be applied to the three phase load.

While the invention has been described in terms of its preferred embodiment, it should be understood that numerous modifications may be made thereto without departing from the spirit and scope of the invention as defined in the appended claims. It is intended that all such modifications fall within the scope of the appended claims.

We claim:

1. A multiple phase inverter with a neutral comprising:
   a plurality of pairs of phase switches, each pair of phase switches being connected in series between first and second reference potentials, each switch being switched between conductive and nonconductive states;
   a plurality of outputs each respectively coupled at a junction between a different pair of the plurality of pairs of switches;
   means for causing each switch of a pair of switches which is coupled to one of the first and second reference potentials to be conductive for an interval and for causing at least one other switch of one of the other pairs of switches which is coupled to the other of the first and second reference potentials to also be conductive during the interval to provide a path for current between the switches without a neutral connecting the conductive switches to the load;
   a filter having a plurality of inputs coupled respectively to a different one of the outputs and forming the neutral, the filter shunting frequency components above a fundamental frequency determined by a switching rate of the pairs of switches to the neutral and providing a plurality of different phase outputs at the fundamental frequency;
   a multiple phase transformer having a plurality of windings coupled in a wye configuration with a first terminal of a plurality of inputs respectively coupled to a different one of the plurality of phase outputs and a second terminal of the windings coupled to the neutral and a phase output coupled to each of the windings, the transformer having a secondary with a plurality of secondary windings connected in a delta configuration; and wherein
   the phase outputs of the transformer each respectively are for connection to a separate phase of an unbalanced multiple phase load.

2. A multiple phase inverter in accordance with claim 1 wherein:
   the transformer is a step up transformer with a DC potential applied across switches in the inverter which is less than a maximum potential of the phase outputs.

3. A multiple phase inverter in accordance with claim 2 wherein:
   the conductive interval of each switch is pulse width modulated during a cycle of current with a duty cycle proportional to a desired magnitude of current on a different one of the phase outputs.

4. A multiple phase inverter in accordance with claim 3 wherein:
   three phases and three pairs of switches are contained in the multiple phase inverter.

5. A multiple phase inverter in accordance with claim 1 wherein:

the inverter is for use in an airframe.

6. A multiple phase inverter with a neutral comprising:
- a plurality of pairs of phase switches, each pair of phase switches being connected in series between first and second reference potentials, each switch being switched between conductive and nonconductive states;
- a plurality of outputs each respectively coupled at a junction between a different pair of the plurality of pairs of switches;
- means for causing each switch of a pair of switches which is coupled to one of the first and second reference potentials to be conductive for an interval and for causing at least one other switch of one of the pairs of switches which is coupled to the other of the first and second reference potentials to also be conductive during the interval to provide a path for current between the switches without a neutral connecting the conductive switches to the load;
- a filter having a plurality of inputs coupled respectively to a different one of the outputs and forming a neutral, the filter shunting frequency components above a fundamental frequency to the neutral and providing a plurality of different phase outputs at the fundamental frequency determined by a switching rate of the pairs of switches;
- a multiple phase transformer having windings in an interconnected star configuration with a first terminal of a plurality of inputs respectively coupled to a different one of the plurality of outputs and a second terminal of the windings coupled to the neutral and a phase output coupled to each of the windings; and wherein
- the phase outputs of the transformer are each respectively for connection to a separate phase of an unbalanced multiple phase load.

7. A multiple phase inverter in accordance with claim 6 wherein:
- the transformer is a step up transformer with a DC potential applied across switches in the inverter which is less than a maximum potential of the phase outputs.

8. A multiple phase inverter in accordance with claim 7 wherein:
- the conductive interval of each switch is pulse width modulated during a cycle of current with a duty cycle proportional to a desired magnitude of current on a different one of the phase outputs.

9. A multiple phase inverter in accordance with claim 8 wherein:
- three phases and three pairs of switches are contained in the multiple phase inverter.

10. A multiple phase inverter in accordance with claim 9 wherein:
- the inverter is for use in an airplane.

* * * * *